June 2, 1959 L. PÉRAS 2,888,841
TORQUE-CONVERTER TRANSMISSIONS
Filed June 30, 1955 2 Sheets-Sheet 1

June 2, 1959  L. PÉRAS  2,888,841
TORQUE-CONVERTER TRANSMISSIONS
Filed June 30, 1955  2 Sheets-Sheet 2

2,888,841

United States Patent Office
Patented June 2, 1959

2,888,841

TORQUE-CONVERTER TRANSMISSIONS

Lucien Péras, Billancourt, France, assignor to Regie Nationale des Usines Renault, Billancourt, France Application June 30, 1955, Serial No. 519,219

Claims priority, application France August 9, 1954

3 Claims. (Cl. 74—720)

The invention relates to torque-converter transmissions the main application of which is in transmissions of this type provided in motor vehicles.

It has already been suggested that a torque-converter transmission mechanism should be constructed wherein the driven or output shaft is not coaxial with the input shaft, in which mechanism, as a result of the characteristic features forming the subject of the invention, a normal gear ratio free from subjection to the slipping of the torque converter, and one or two reduction ratios benefitting from the advantages of flexibility of the same converter, are obtained by means of a number of toothed wheels restricted to one pair of pinions per reduction ratio.

The invention utilises the majority of the characteristic features of the transmission mechanism described in the above patent, combining them in such a manner as to render them applicable to a transmission of the type known as direct drive wherein the drive shaft is coaxial with the driving shaft.

The accompanying drawing illustrates by way of example one embodiment of a transmission according to the invention.

Figure 1:
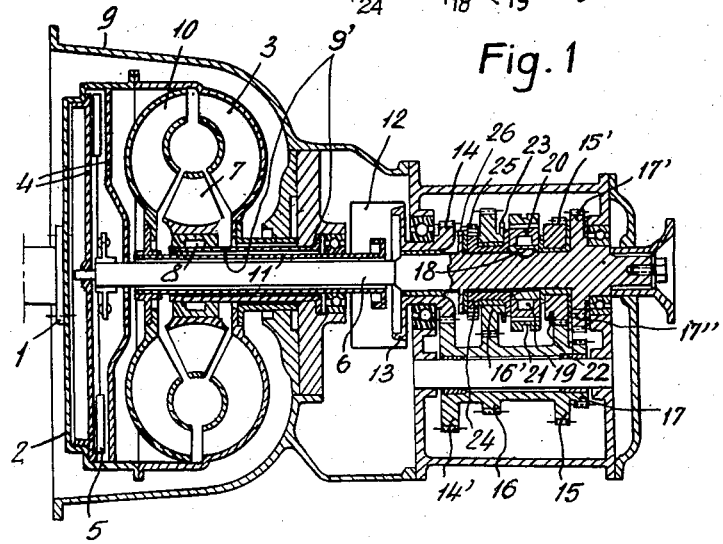
Figure 1 is a diagrammatical longitudinal section through the transmission mechanism.

Referring to Figure 1, it will be seen that 1 is the driving shaft, for example the rear portion of the crankshaft of an internal combustion engine, 2 is a flywheel rigidly connected to said shaft, carrying on the one hand the pump member or impeller 3 of a hydraulic torque converter, and on the other hand the driving surface or surfaces 4 of a known type of clutch, which may be driven mechanically, hydraulically, electrically, etc., the detailed description of which is outside the scope of the invention. The clutch is a hydraulically controlled clutch having a cone 2 driven by driving shaft 1. A piston-like member 4a is mounted to move axially on shaft 6 and is constantly biased by springs, not shown, toward the cone 2. A partition 4b is mounted in fixed axial position relative cone 2 but is rotatable therewith thereby providing opposite faces in conjunction with member 4a for engagement by a clutch disc frictional lining 5a of a clutch disc 5 mounted to rotate with shaft 6 and movable axially relative thereto on splines, not shown. The clutch is engaged by selectively providing oil pressure through axially extending passageways (not shown) in shaft 6 leading into the chamber or oil-tight compartment formed between cone 2 and member 4a thereby overcoming the resistance of the biasing springs and causing the member 4a to move toward partition 4b so as to frictionally engage the disc frictional lining 5a thus imparting rotation to shaft 6. Releasing the oil pressure allows the springs to move member 4a toward cone 2 and the clutch is thereby disengaged. It will be understood that the oil pressure is provided by an oil pump (not shown). According to this construction, the driven member 5 of the clutch is mounted direct on the driven shaft 6 of the mechanism as stated. This shaft may, without going outside the scope of the invention, consist of several portions assembled together or driving one another in rotation by means of a system of keys, cogs or splines, but the transmission of power between the driven member 5 of the clutch and the output of the mechanism takes place without passing through gear teeth or a friction or dog clutch. The reaction member 7 of the torque converter is mounted in the usual manner on a one-way brake 8, which rests on a member 9' rigidly connected to the casing 9 of the mechanism.

The driven member or turbine 10 of the torque converter is mounted at one end of a tubular shaft 11 which is concentric with the shaft 6, and the other end of which forms the input shaft of a synchronised coupling device 12, the output shaft of which is indicated at 13 and the description of which is outside the scope of the invention. This device should meet the following requirements:

(a) Be able to interrupt at will the transmission of movement from the shaft 11 to the shaft 13 despite the residual torque acting on the shaft 11 when the engine is idling;

(b) Restore, gradually and without shock, the transmission of said residual torque from the shaft 11 to the shaft 13;

(c) Once this operation has been effected, be capable of transmitting to the shaft 13 the maximum output torque of the torque converter.

Figure 4:
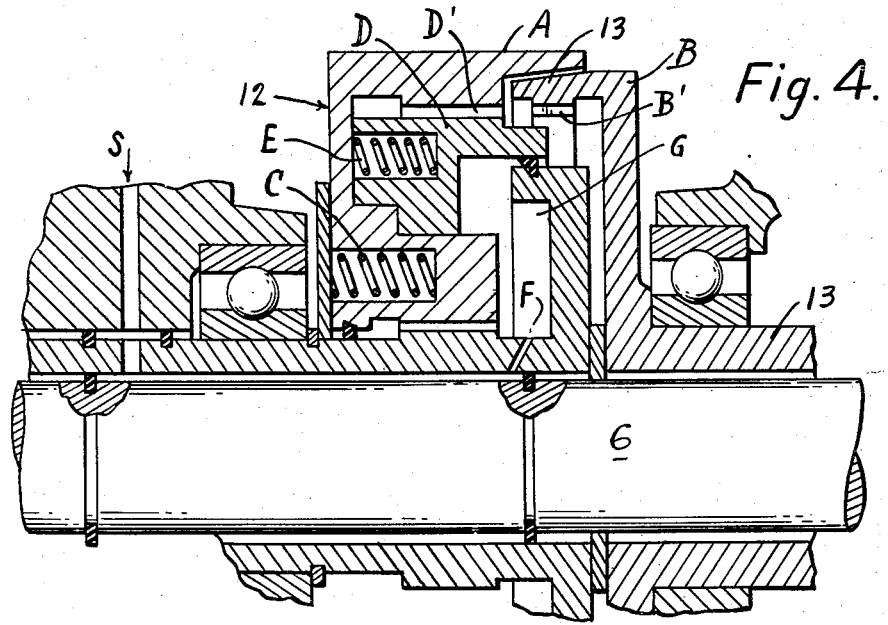
Figure 4 is a sectional view on an enlarged scale of a coupling mechanism shown in Fig. 1.

By way of non-limiting example, one embodiment may be constructed as follows: The coupling device comprises (Figs. 1 and 4) a driven clutch cone member A selectively frictionally engaging a cooperating flanged portion B fixed to the output shaft 13. The member A is constantly biased into engagement with portion B by a spring C. A member D provided with clutch teeth D' is biased by a second spring E toward portion B so that its teeth can engage the teeth B" of portion B thereby effecting positive engagement. In order to disengage the coupling device 12 oil pressure is applied through passageway F into compartment G formed as an oil tight-chamber between portion B and members A and D as shown. The oil pressure overcomes the springs C and E and maintains the clutch members disengaged. In the absence of pressure member A is biased into frictional engagement with output shaft portion B so that it brings its substantially to the same speed allowing easy engagement of the clutch teeth D and B'. It will be understood that the oil or hydraulic fluid pressure is applied from an oil-gear-pump 31 which is controlled by means of an electrical arrangement, later herein described, controlled by a push-button switch (not shown) operable by the driver and conveniently located at a convenient point, for example, on a gear shift lever 32. Accordingly, the coupling device 12 is engaged when the chamber G is at atmospheric pressure and disengaged when fluid pressure is selectively applied thus the operation of the coupling device 12 and the clutch are synchronized.

Figure 5:
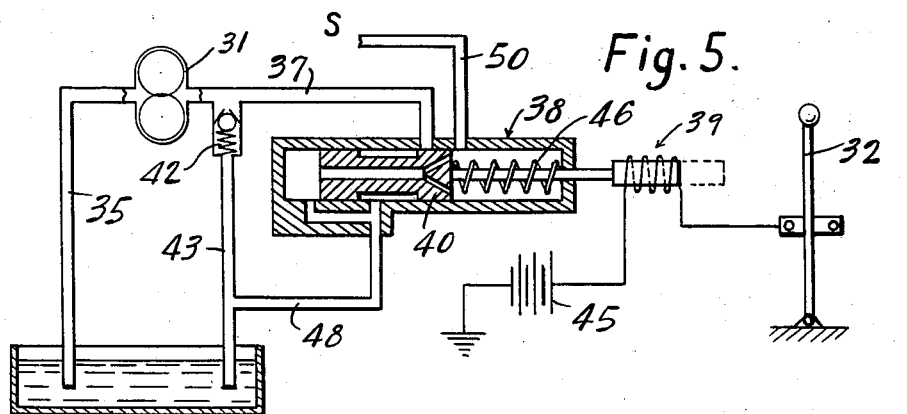
Fig. 5 is a schematic diagram of an oil pressure system for effecting selective control of the coupling mechanism shown in Fig. 4.
Figure 6:
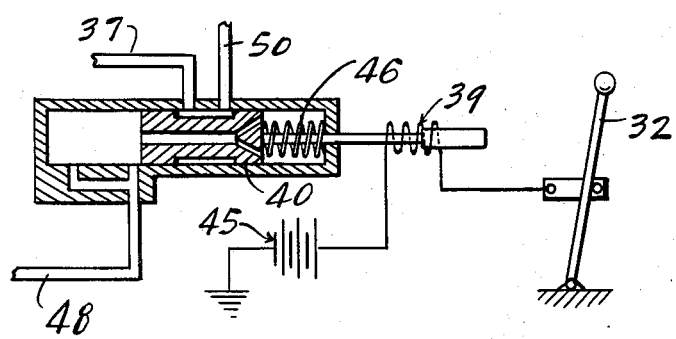
Fig. 6 is a fragmentary view of the system of Fig. 5 and is illustrative of the position of elements thereon when pressure is being applied from the system to the coupling mechanism shown in Fig. 4.

The pump 31 is constantly driven and takes a suction from a reservoir 34 through line 35, and discharges through line 37 to a valve 38 operated by a solenoid 39 controlled by the switch on gear shift lever 32. When the valve element 40 is in the position shown in Fig. 5, the valve 38 is closed and the oil under pressure unseats a one-way valve 42 and the oil discharges to the reservoir 34 through line 43. When the vehicle operator operates the switch the solenoid 39 is energized from a source of current 45 and the valve element 40 moves to the position shown in Fig. 6 overcoming the resistance of a spring 46 assisted by oil pressure through line 48 so that line 47 is placed in communication with line 50. Oil under pressure flows in the direction of the arrow S into a passageway in the coupling mechanism (Fig. 4) and enters chamber G through the passage F. It will be understood that the switch is closed by the operator when the car is in not moving and is depressed when starting the vehicle in a forward or reverse direction. It does not have to be depressed or actuated during operation in higher gear ratios, however, if inadvertently actuated during a gear shifting operation no difficulty is experienced in effecting the gear ratio change.

It will be further understood that both the clutch and the coupling device 12 have the hydraulic pressure applied simultaneously thus one is released thereby while the other is engaged. Moreover, the device 12 is engaged by the driver when stopped and he wishes to go ahead or in reverse. If the device 12 is inadvertently engaged during changing of gear ratios it will not cause any inconvenience due to the functioning of a free-wheel later herein described.

The output shaft 13 of the coupling 12 carries one pinion 14 of a pair of pinions 14 and 14' in constant mesh.

The pinion 14' is rigidly connected to an intermediate shaft likewise carrying the pinions 15, 16 and 17.

The pinions or gears 15 and 16 engage respectively with the pinions or gears 15' and 16' mounted loose on the shaft 6. Their number of teeth, like that of the pinions 14 and 14', is selected in such a manner as to effect two different reduction ratios, a "drive" ratio suitable for normal running on flat or hilly country, and a "low" ratio for steep inclines.

Figure 2:
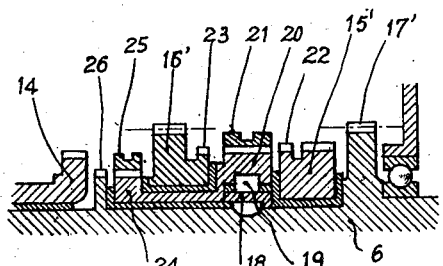
Figure 2 is a longitudinal section, on a larger scale, of part of the mechanism in Figure 1.

The pinion 17 is mounted opposite the pinion 17', rigidly connected to the shaft 6, but does not mesh with it. An intermediate pinion 17", mounted loose on a shaft parallel to the preceding ones, can be brought into mesh with the pinions 17 and 17' to effect the transmission for running in reverse, in accordance with a well known arrangement. On the shaft 6, between the pinions 15' and 16' is fixed the internal member 18 of a free-wheel 19, the outer member 20 of which carries, keyed for sliding thereon, a sleeve 21 provided externally with a groove receiving a conventional selector-fork 21' operable by an operator-controlled rod 22". By axial displacement of rod 22" manually with a lever (not shown) the sleeve 21 may be brought into mesh either with teeth 22 rigidly connected to the pinion 15' or with teeth 23 rigidly connected to the pinion 16' (Figs. 2 and 3).

The free-wheel 19 is mounted in such a manner that it permits its internal member 18, rigidly connected to the shaft 6, to rotate faster in the direction of rotation of the engine than its external member 20, but causes the driving of the member 18 through the member 20 in the direction of rotation of the engine.

Figure 3:
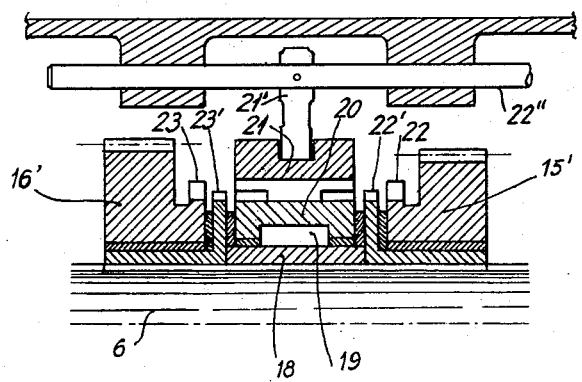
Figure 3 shows a characteristic free-wheel locking system.

The operation of the free wheel may be prevented by a locking device illustrated in Figure 3, wherein the sleeve 21, as a result of a first displacement towards the left or towards the right, connects the rotor of the free-wheel 20 to the pinions 15' or 16' (fitting into the dog 22 or 23) and as a result of a second displacement, greater than the first, towards the left or towards the right, connects the dog 22 of the pinion 15' or the dog 23 of the pinion 16' direct, respectively to the dogs 22' or 23' rigidly connected to the shaft 6, or by any other known system of locking.

In Figure 1, a tubular shaft 24, rigidly connected for rotation to the member 20, carries a sleeve 25 keyed for sliding thereon, which may be brought into mesh, by means of a suitable control with teeth 26 rigidly connected to the shaft 6.

The operation of the mechanism is as follows:

When the engine is running idly, with the clutch 4—5 disengaged, the coupling 12 in the position of rest, that is to say, engaged, and the sleeve 21 and the reverse-running pinion 17" in the neutral position where they do not engage with the corresponding teeth, the assembly comprising the shaft 13 and the pinions 14 and 14', 15 and 15', 16 and 16' and 17, is driven in rotation by the engine under the influence of the residual torque transmitted by the torque converter. When the coupling 12 is disengaged, the transmission of this torque is interrupted thus causing the stopping of the pinions listed above. It is then possible to engage without shock the selected gear, that is to say, either the reverse gear, by sliding the pinion 17", or the "drive" gear, by engaging the sleeve 21 with the teeth 22, or the "low" gear, by engaging the sleeve 21 with the teeth 23. At this moment, the coupling 12 may be restored to the engaged position and, if the driver accelerates the engine, the vehicle will be set in motion by means of the torque converter. In these circumstances, the power transmission is effected in the following manner: shaft 1, flywheel 2, torque converter 3—7—10, shaft 11, coupling 12, shaft 13, pinion 14 and 14' and, according to the gear selected, reverse (17—17"—17' and shaft 6), drive gear (pinions 15 and 15', teeth 22, sleeve 21, free-wheel 20—19—18, shaft 6) or low gear (pinions 16 and 16', teeth 23, sleeve 21, free-wheel 20—19—18, shaft 6). All these gears give on the output shaft a higher torque than the driving torque, on the one hand as a result of the increase in the torque produced by the converter, on the other hand as a result of the gear ratios. They are therefore suitable for those cases where good acceleration is desired and where a considerable resistance has to be overcome.

The direct drive position, used when no increase in the driving torque is needed, is obtained by engaging the clutch 4—5 by means of a control which is not illustrated on the figure and which varies according to the nature of the clutch, said control being actuated either by the driver or, preferably, by an automatic device of one of the many known types, sensitive to the power output of the engine and to the speed and which, depending on these parameters and in accordance with a carefully selected law, causes the passage from a reduction gear-ratio to direct drive and vice-versa.

I claim:

1. In a power transmission unit in combination, an input shaft, a torque converter having driving, driven and reaction elements and an output shaft, a variable change speed gear box having an output shaft substantially co-axial with said input shaft, coupling means for selectively coupling said converter output shaft to said gear box, said gear box including means providing reduction gear ratios comprising two gears mounted loose on said gear box output shaft, each of said gears corresponding to two gear ratios lower than a direct drive ratio, a free-wheel, said free-wheel being mounted between said two gears and having an internal member fixed on said gear box output shaft, a dogged sleeve carried peripherally on said free-wheel, said sleeve being movable axially between a plurality of predetermined positions, means for selectively moving the dogged sleeve axially for engaging one or the other of said gears, whereby two lower gear ratios can be selectively effected by a single free-wheel.

2. A power transmission unit according to claim 1, further including means rigid with the output shaft of the gear box, said last mentioned means being positioned on either side of said free-wheel, whereby when said means for selectively moving the dogged sleeve is actuated past a predetermined position for selecting and engaging one of said gears, a new predetermined position is reached where said means rigid with the gear box output shaft is engaged by the sleeve thereby engaging said selected gear with the output shaft.

3. In a power transmission unit in combination, an input shaft, a torque converter having driving, driven and reaction elements and an output shaft, a variable change speed gear box having an output shaft substantially co-axial with said input shaft, said gear box including means providing reduction gear ratios comprising two gears mounted loose on said gear box output shaft, coupling means for selectively coupling said converter output shaft to said means providing reduction gear ratios, each of said two gears corresponding to two gear ratios lower than a direct drive ratio, a free-wheel mounted between said two gears and having an internal member fixed on said gear box output shaft, a dogged sleeve carried peripherally on said free-wheel, said sleeve being movable axially between a plurality of predetermined positions, means for selectively moving the dogged sleeve axially for engaging one or the other of said two gears, whereby two lower gear ratios can be selectively effected by a single free-wheel, means for selectively engaging said coupling means once said sleeve engages one of said gears to effect selection of a lower gear ratio, whereby the gear box output shaft receives an increased torque corresponding to the increased torque produced by the converter and the lower gear ratio.

References Cited in the file of this patent
UNITED STATES PATENTS

| | | |
|---|---|---|
| 2,612,061 | Schjolin | Sept. 30, 1952 |
| 2,620,684 | McFarland | Dec. 9, 1952 |
| 2,623,411 | Herndon | Dec. 30, 1952 |
| 2,627,189 | McFarland | Feb. 3, 1953 |
| 2,695,696 | Iavelli | Nov. 30, 1954 |
| 2,709,926 | Jandasek | June 7, 1955 |